US008451504B2

(12) United States Patent
Xu et al.

(10) Patent No.: US 8,451,504 B2
(45) Date of Patent: *May 28, 2013

(54) BANDING DEFECT DETECTION IN DIGITAL IMAGING SYSTEMS (75) Inventors: Beilei Xu, Penfield, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 917 days.

This patent is subject to a terminal disclaimer.

(21) Appl. No.: 12/552,519

(22) Filed: Sep. 2, 2009

(65) Prior Publication Data

US 2011/0052010 A1    Mar. 3, 2011

(51) Int. Cl.
*H04N 1/40*   (2006.01)
(52) U.S. Cl.
USPC .......................................... 358/3.26; 358/468
(58) Field of Classification Search
USPC ................. 358/1.18, 3.26, 1.9, 2.1, 504, 406, 358/3.2, 3.24, 530, 468
See application file for complete search history.

(56) References Cited

U.S. PATENT DOCUMENTS

| | | | |
|---|---|---|---|
| 7,376,269 B2 | 5/2008 | Klassen et al. | |
| 2005/0134623 A1 | 6/2005 | Mizes | |
| 2006/0103899 A1 | 5/2006 | Wu | |
| 2006/0209101 A1 | 9/2006 | Mizes | |
| 2007/0052991 A1 | 3/2007 | Goodman et al. | |
| 2007/0236747 A1 | 10/2007 | Paul | |
| 2008/0013848 A1 | 1/2008 | Wu et al. | |
| 2009/0002724 A1 | 1/2009 | Paul et al. | |
| 2011/0299099 A1* | 12/2011 | Xu et al. | 358/1.9 |

OTHER PUBLICATIONS

Cheng, et al., "Evaluation of an LED Printer and Printhead using Print Quality Analysis," Paper presented at the IS&T's NIP17 International Conference on Digital Printing Technologies, Sep. 30-Oct. 5, 2001, pp. 1-7, Ft. Lauderdale, Florida.
Cui, et al., "Measuring Visual Threshold of Inkjet Banding," pp. 1-6, Lexmark International, Inc., 740 New circle Road, Lexington, KY 40550.

* cited by examiner

*Primary Examiner* — Thomas D Lee
*Assistant Examiner* — Stephen Brinich
(74) *Attorney, Agent, or Firm* — Philip E. Blair; Fleit Gibbons Gutman Bongini & Bianco P.L.

(57) ABSTRACT

What is disclosed is a novel system and method for banding defect detection and analysis in digital imaging systems. The present method utilizes the gray levels of image regions and a collection of sequence of user images to improve the banding analysis. One embodiment hereof includes: segmenting images into regions; determining banding information for each page over a given sequence of images and detecting problem banding defect frequencies; estimating the banding amplitude(s) and average gray levels for each segmented region for each identified banding frequency(ies); and determining, through a process of interpolation, the banding amplitude for the image or sequence of images based on the banding amplitude and average gray levels of each region. Thereafter, notification can be provided to a key operator when the amplitude(s) are expected to exceed pre-determined levels over the course of a production run. The method demonstrates advantages in banding detection over whole-page methods.

20 Claims, 5 Drawing Sheets

BANDING DEFECT DETECTION IN DIGITAL IMAGING SYSTEMS

TECHNICAL FIELD

The present invention is directed to systems and methods for detecting and analyzing banding defects within a print system to facilitate the diagnosis of image quality in complex digital imaging system architectures.

BACKGROUND

In digital image print systems, physical alignments, component tolerances, wear and component age can influence the macro-uniformity with which colorants, such as inks and toners, are laid down across the surface of print media. Detection of such print defects helps device operators and system designers ensure the continued production of uniform quality images throughout the life of a document reproduction device. Although some defects impacting image quality may not be entirely visible to the unaided eye, these defects nonetheless indicate that one or more aspects of the print device are no longer performing within acceptable parameters and/or defined tolerances.

Banding is one image quality defect which can occur in complex digital document reproduction system architectures. Banding defects are often observed as periodic variations in printing intensity along the printing direction of the digital document reproduction system. Banding defects are visually objectionable image quality artifacts caused by mechanical or electronic defects in the print engine used to render the output image. Banding defects can also "beat" with other frequency components in the print device, such as halftones, to cause objectionable secondary banding defects.

Deterioration in the performance or function of components of a document reproduction system may induce banding defects that are able to be observed in the output of such systems. Often, defects of various components in the document reproduction system will exhibit banding defects in the output of such systems that exhibit a particular frequency. Identification of an increase in amplitude at such particular frequencies in the printed output of a document reproduction system indicates that the component, such as an internal part or subsystem, requires service or replacement. The output of a document reproduction system can be analyzed to identify an increase in amplitude at particular frequencies of banding defects. The identification of a banding defect with significant amplitude at a particular frequency in the output of a document reproduction system indicates that the component or subsystem associated with that frequency requires service or replacement.

In order to maintain a quality of output for a document reproduction system, it is advantageous to monitor the system's banding performance to detect banding defects prior to the amplitudes of those banding defects reaching an unacceptable level. Some systems cause the document reproduction system to print pre-designed test targets that are then analyzed to detect banding defects. Such test targets can be designed to cause outputs to be printed that are highly sensitive to low amplitude banding defects induced by the document reproduction system. However, test-target printing in a production document reproduction system interrupts regular print/copy jobs, reduces job throughput, and wastes valuable time and resources.

Accordingly, what is needed in this art are increasingly sophisticated methods to detect and analyze banding defects on user document images to improve real-time image quality trend analysis in digital imaging systems.

BRIEF SUMMARY

What is disclosed is a novel system and method for banding defect detection in user document images to improve image quality trend analysis in multifunction digital imaging system architectures. The present banding detection process uses region-based, time sequence analysis, and graylevels of image regions in a collection of a sequence of regions, to improve banding detection. Through an implementation of the present banding detection method, image quality trend analysis can be performed in such a manner that a page count estimate when a given banding defect begins to fall below a pre-defined level of acceptable image quality over the course of a production run. The present method demonstrates a clear advantage in banding detection over current whole-page methods. Moreover, results demonstrate that the false alarm rate (i.e., incorrectly detecting defect where none exists) drops precipitously.

In one example embodiment, the present system and method for detecting banding defects in a digital imaging system includes the following. First, a number of digital images are scanned into a digitized form. Each of the scanned images corresponds to a page printed by a digital imaging system under test, whereon banding defects are intended to be analyzed. A number of segmented regions are then identified within each image. The segmented regions include standard image regions. Banding frequency information from at least one color parameter value within each of the segmented region is determined. A banding amplitude associated with at least one recurring banding frequency over the number of images is estimated. At least one targeted banding defect is estimated based upon the banding amplitude and the recurring banding frequency. An alert is initiated to an operator of the digital imaging system in response to the identified targeted banding defect reaching or exceeding a predefined level.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a novel system and method for banding defect detection in user document images to improve image quality trend analysis in multifunction digital imaging system architectures. The present method demonstrates a clear advantage in banding detection over current whole-page analysis methods. In one embodiment, the multiple printed pages produced by a digital imaging system according to user print jobs are analyzed to determine banding defects. These multiple printed pages are scanned and standard images, such as printed areas containing pictorial and graphic images, are identified within these multiple pages. These standard images identified within the multiple pages are consolidated and analyzed to determine image frequency components that correspond to banding defects. The techniques of one embodiment of the present invention allow analysis of user print jobs, which are able to contain any type of images that do not have a priori defined characteristics, by combining a number of standard images, which are assumed to be weakly correlated across the samples used, in order to extract banding frequency information that is highly correlated across the number of printed pages being analyzed.

It should be understood that one of ordinary skill in this art should be readily familiar with the digital imaging system quality monitoring and troubleshooting techniques employed herein, particularly those which directly relate to detecting and quantifying banding within a digital imaging system's output, analysis of scanned images to determine banding within an imaging system's output, correlating observed banding to failures within or identification of required maintenance of an imaging system, and frequency analyses of image segments to obtain banding frequency data. One of ordinary skill would also be knowledgeable about computer science, and software and hardware programming systems and methods sufficient to implement the functionality and capabilities described herein in their own document system environments without undue experimentation.

The term "digital imaging system" refers herein to a wide variety of digital imaging system architectures wherein banding defects can or are likely to occur. The set of digital imaging systems to which the present method is directed includes monochrome or color digital document reproduction architectures, document scanning systems, a wide variety of printers/copiers, book/magazine/newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data. The image processing system can be a hardware or software construction which preferably resides in the image path of the device. It should also be understood that one or more functions, features, or capabilities performed by a computer system or special purpose processor (such as an ASIC) performing one or more aspects of the present banding defect detection and trend analysis method, as described more fully herein, may be integrated, in whole or in part, with any system or sub-system of such a digital imaging system.

"Segmentation" refers to the process of partitioning a digital image into multiple segments. One goal of segmentation is to simplify and/or change the representation of the digital image into something that can be more easily analyzed. A result of image segmentation is a set of segments that collectively cover the image or a set of contours extracted from the image. Image segmentation is typically used to locate objects and/or boundaries (i.e., lines, curves, etc.) in the received image. Typically, a label is assigned to every pixel in the image such that pixels with the same label share certain visual characteristics. Each of the pixels in a region is similar with respect to some characteristic or property, such as close proximity, color, intensity, or texture. Adjacent regions tend to be different with respect to these same characteristic(s). Several general-purpose algorithms and techniques have been developed for image segmentation. One example image segmentation technique is described in: Robert M. Haralick and Linda G. Shapiro, *Computer and Robot Vision*, Vol. II, Prentice Hall, (2002), ISBN-10: 0201569434, ISBN-13: 978-0201569438. Since there is no general solution to the image segmentation problem, these techniques often have to be combined with domain knowledge in order to effectively solve an image segmentation problem for a given problem domain.

A "Banding Defect" (or "Banding") refers to an observable defect contained within an output print of a digital imaging system. Banding defects are visually perceptible periodic lines, or more generally as periodic bands, observed in solid or halftone pattern area fills that do not appear smooth. These can be a result of defects or wearing-out of mechanical or electronic components in a digital imaging system or by the printer advancing the media too much or too little. When observing the intensity of colors (e.g. $L^*/a^*/b^*$) of an image print, banding defects appear as periodic "light" and "dark" patterns at specific frequencies masked by the image content. This uneven pattern of the intensity of colors is especially objectionable at regions with near-uniform colors at around mid-tone of an image print. Since user images have different content from one region to another (or from page to page), frequency components contributed by the image content are less likely to repeat. However, for a banding defect, the particular frequency will often appear over and over again in differing regions within a given page and over a sequence of pages. When the image contents are busy with rich frequency components, banding defects tend to be more difficult to detect. Certain images may also be less sensitive to banding defects.

"Banding Frequency" refers to a frequency at which a banding defect occurs in an output print and is generally related to an inverse of a period between extrema observed in the printed output.

"Banding Frequency Information" refers to information describing the banding frequencies, amplitudes, and optionally phases exhibited in an output print and are able to be obtained, for instance, by performing a Fourier transformation of the image data.

"Banding Frequency Occurrence Histogram" refers to a histogram of occurrence vs. frequency which describes the occurrences of each frequency component that has an amplitude exceeding a threshold across segmented regions of a sequence of pages. Banding frequency Occurrence Histograms are generally used to identify recurring frequencies for banding defect detection when a specification of at least one frequency of interest is not received.

A "Color Parameter Value" is a value that parametrically expresses a produced or sensed color. Example color parameter values include, for example, a value of graylevel in lightness or hue, a value for one component (or a combination of components) in RGB, LAB, or CMYK color systems, or be a value in any parametric representation of color.

"Banding Amplitude" refers to a measure of a difference between minima and maxima of a color parameter value that is caused by banding.

A "Standard Image" refers to image segments within a document that do not share image frequency components having appreciative amplitudes with other images within the document and/or do not have image frequency components that may interfere with banding detection. For example, images containing text have a frequency component with appreciable amplitude at the text line rate. Other image that contain text with the same line rate also have an appreciable amplitude at that frequency component, and therefore those two images share image frequency components having appreciative amplitudes with other images within the document and would be excluded in the banding analyses. In another example, images with a graphic element such as line drawings or sharp edges containing high frequency components with high amplitudes that would tend to degrade the ability to detect banding are excluded from standard images. One method to extract Standard Images is to first identify a characteristic "type" of an image object, such as text, blank, graphics, and pictorials in the document and use only the image objects identified as graphics and pictorials as a standard image. Another method is to identify halftone regions as regions to be analyzed while excluding blank and solid regions as standard images. Yet another method is to identify near-uniform regions, i.e. a contiguous region with color values of each pixel falling within a threshold range of a mean color of the region, as standard images via color clustering techniques (such as K-mean) and the use of morphological filters. The selection of Standard Images in the below described processing is able to be based on the characteristics of the type of banding defects that are desired to be detected, such as banding defects that fall within a particular frequency and amplitude range.

Figure 1:
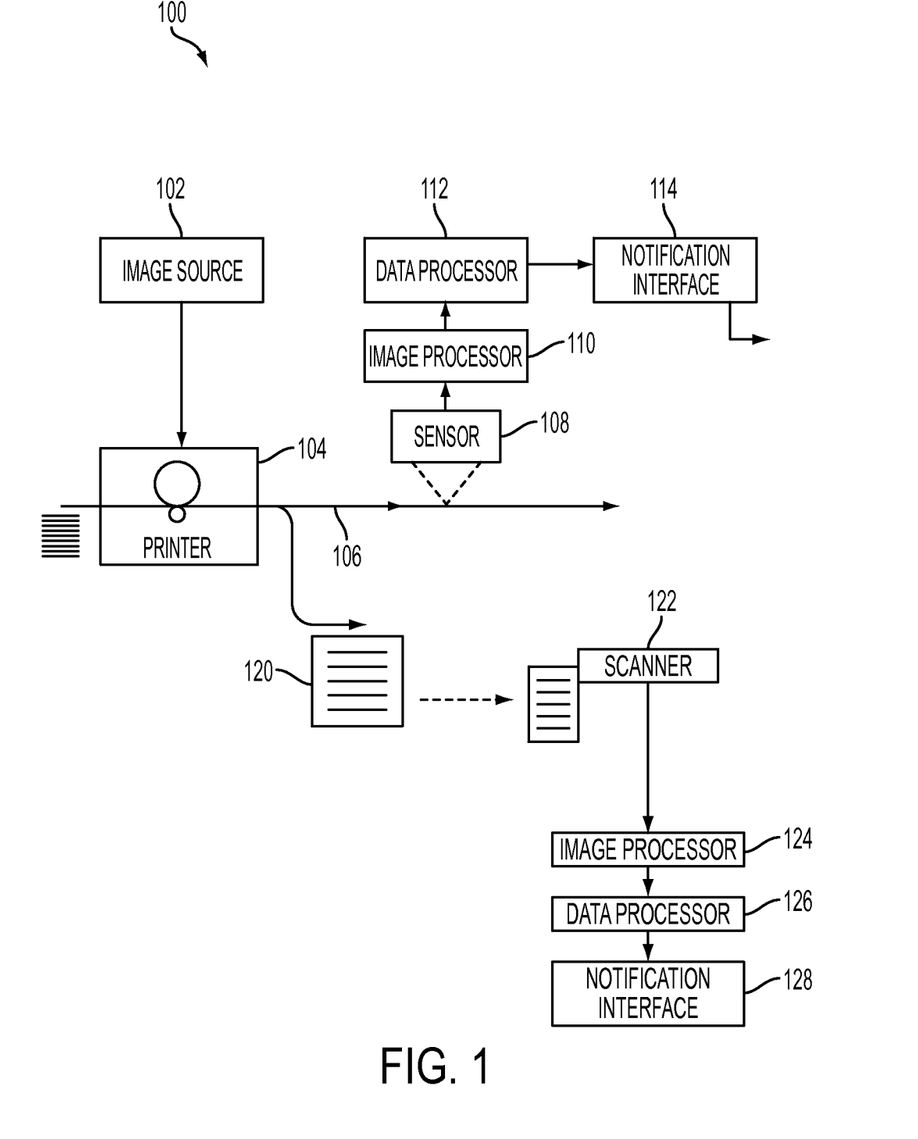
FIG. 1 illustrates a functional block diagram for an example system suitable to implementing one embodiment of the present method to improve image quality trend analysis.

Reference is now made to FIG. 1, which illustrates a functional block diagram for a system suitable to implementing an embodiment of the present invention.

The functional block diagram 100 of FIG. 1 illustrates a printer 104 that receives digital image data defining a plurality of digital images from an image source 102. The digital images of one embodiment define a plurality of images that each represents one page to be printed by printer 104. The images that define each page printed by the printer are able to contain regions that contain text data as well as standard image regions. Standard image regions are able to include, for example, graphical data, photographic images, and other similar non-textual data. In one embodiment, the digital image data contains user provided data that are desired to be printed by a user and do not contain images that are intended to only characterize banding defects within the printed output.

Printer 104, of one embodiment, produces pages 106 onto which corresponding user image data are printed. When components of the printer wear or begin to fail, for example, the pages produced may contain banding defects as a result. The pages produced by the printer are provided in one embodiment to a sensor 108. The sensor, in one embodiment, scans the pages and produces an electronic representation of the image printed on each page. These electronic representations are provided to an image processor 110. As is described in further detail below, the image processor processes the electronic representations of the images and identifies standard image regions within each image corresponding to a page. The data representing the identified standard image regions detected by the image processor are, in turn, provided to data processor 112. The data processor processes the data representing the identified standard image region data in order to identify targeted banding defects being exhibited by the printer. As is described herein further, the data processor initiates, in response to detection of a targeted banding defect, an activity. Such activities are able to include, for example, sending a control signal to the printer 104 or sending an alert to an operator through a notification interface 114. The notification interface is able to, for example, flash a light or sound an audible alarm, display messages on a device control panel or operator's station, and send text/email messages to service personnel responsible for maintenance of the printer. The notification interface may further contact a key operator of the device or a manager thereof via, for example, a cellular communications link and play a pre-packaged message or leave a voicemail. Other embodiments hereof are intended to fall within the scope of the appended claims.

In an alternative embodiment, the printer 104 produces printed output consisting of multiple printed sheets that are delivered into an output bin 120. The multiple printed sheets delivered into the output bin 120 are then transferred to a scanner 122. The scanner 122 of one embodiment scans the multiple printed sheets and produces an electronic representation of the image printed on each page. These electronic representations are provided to an image processor 124, which in one embodiment is similar to the image processor 110 described above. The data representing the identified standard image regions detected by the image processor are, in turn, provided to data processor 126, which is similar to the data processor 112 discussed above. The data processor processes the data representing the identified standard image region data in order to identify targeted banding defects being exhibited by the printer. As is described herein further, the data processor initiates, in response to detection of a targeted banding defect, an activity. Such activities are able to include, for example, sending a control signal to the printer 104 or sending an alert to an operator through a notification interface 128, which is similar to the notification interface 114 described above.

Figure 2:
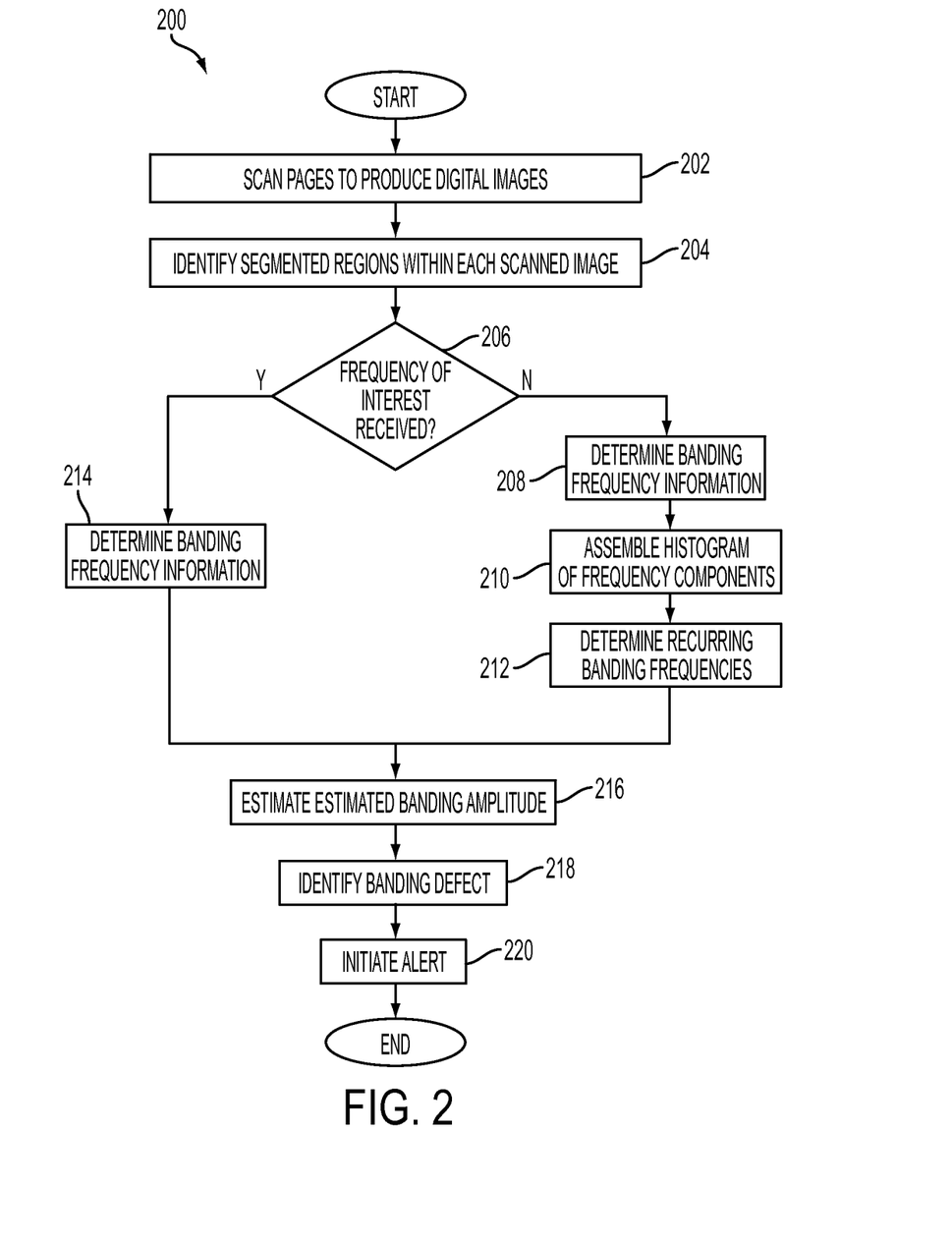
FIG. 2 illustrates one example processing flow diagram of one embodiment of the present method for detecting banding defects to improve image quality trend analysis in multifunction digital imaging system architectures.

Reference is now made to FIG. 2, which illustrates a processing flow diagram of a method according to one embodiment of the present invention.

At 202, multiple digital images with each image corresponding to a page printed by a digital imaging system are scanned. As described above with reference to FIG. 1, one embodiment scans pages produced by printer 104 utilizing sensor 108.

At 204, within each image of the multiple digital images, segmented regions are identified that contain standard image regions of each image. Further explanation of the identification performed by one embodiment hereof will now be made with reference to FIGS. 3 and 4.

Figure 3:
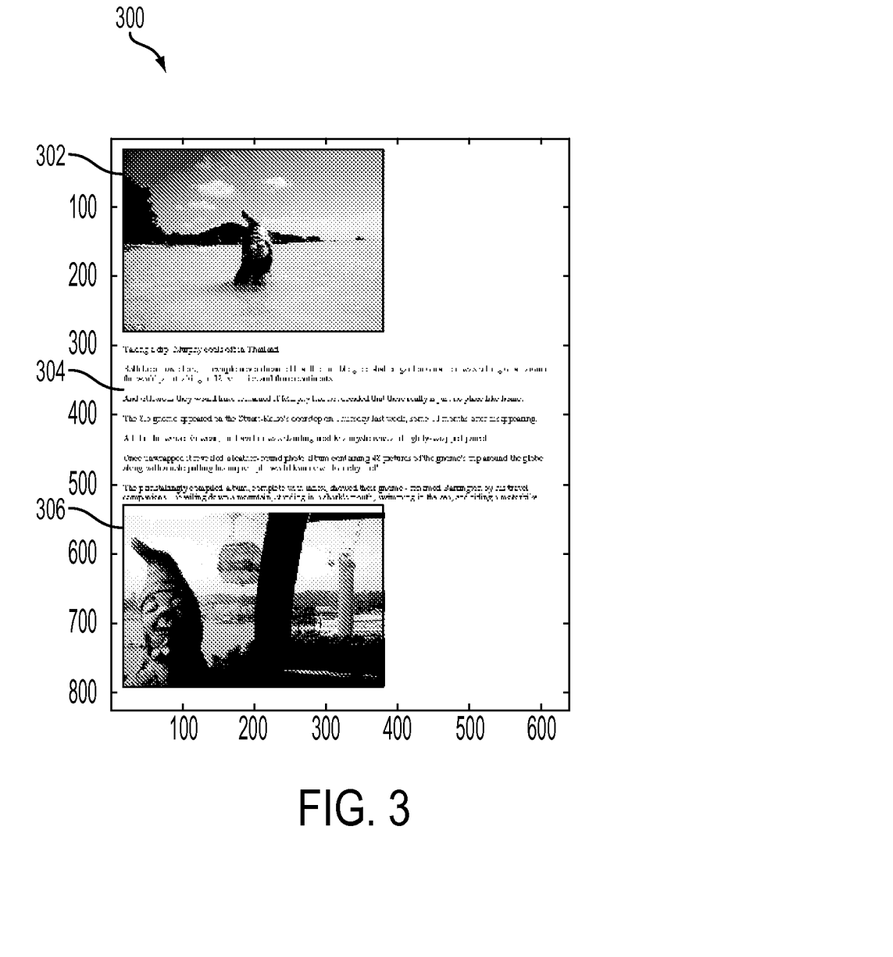
FIG. 3, illustrates an example image obtained by scanning a page printed by the printer illustrated in FIG. 1.

In FIG. 3, an example image 300 having a first pictorial region 302 and a second pictorial region 306 is illustrated. The example image 300 was obtained by scanning a page printed by printer 104 of FIG. 1. Text region 304, which is shown between standard image regions 302 and 306, contains a few lines of illustrative text. In this example, the two standard image regions that have been measured to have mean graylevels of 167 and 139, respectively, where a full scale value for the graylevel is 255. The following further assumes that image 300 has a mean graylevel of 202 determined over the overall page. A mean graylevel, in this context, refers to a mean value of a color parameter value obtained by averaging the value of that color parameter value for each pixel in that region, for example, the 8-bit L* value in the Lab color space used in one embodiment. It should be appreciated that the sensitivity of banding in printed images has been observed to be essentially graylevel dependent, with the sensitivity having been observed to peak around mid-tone, i.e., at a value that is approximately half of the full scale value for the color parameter value. Based upon the measured graylevel values of the example image 300, a banding analysis based on the entire page with regions having very different graylevels are able to cause either over-estimation or under-estimation of the true banding amplitude exhibited in the image since the graylevel in individual regions actually exhibiting the banding differs from the peak sensitivity level of mid-tone. It has been observed that the periodic intensity characteristics of a text region, such as text region 304 of image 300, causes many of the frequency components contained within the text region to have a reduced contribution to banding detection based upon observed banding frequencies. One embodiment hereof operates to exclude text regions from the analysis of scanned image regions when estimating banding amplitudes to prevent the inclusion of the frequency components of text regions that have reduced contribution to banding detection. One embodiment hereof utilizes a connected components analysis to first divide an image of each full page into smaller, near uniform regions that include standard image regions. Some embodiments are able to fill small holes within standard image regions by a binary dilation within each region.

Figure 4:
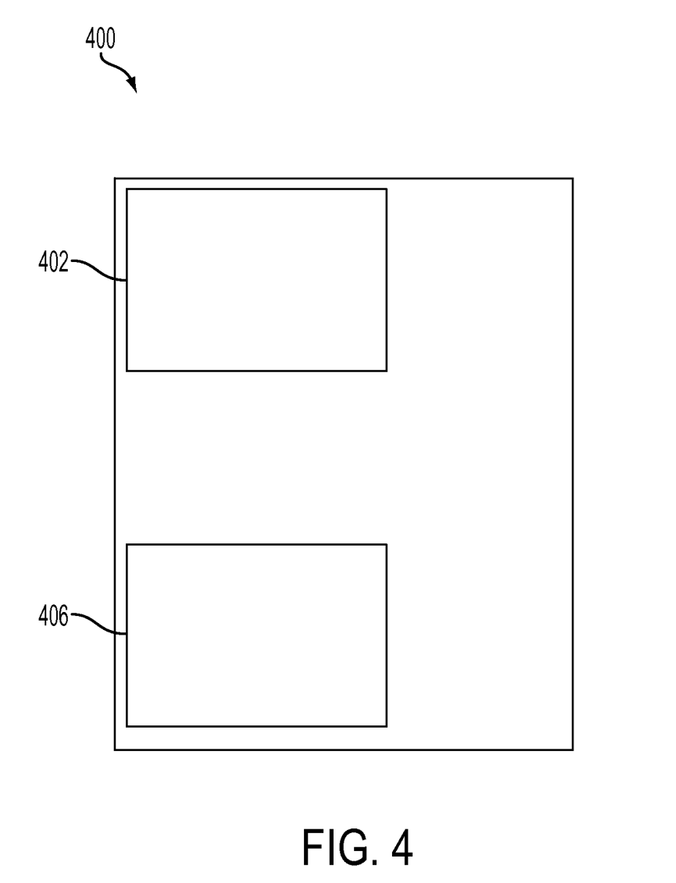
FIG. 4, illustrates the identified segmented regions of the example image illustrated in FIG. 3.

In FIG. 4, the identified segmented regions 400 of image 300 are illustrated. The identified segmented regions 400 is shown having been bifurcated into two large regions, a first segmented region 402 (near the top) and a second segmented region 406 (near the bottom), of the page. The area between these two identified standard image segmented regions, such as the text region 304, has been discarded in this example. Other embodiments further discard smaller regions as well because these smaller regions provide very limited frequency resolution, due to the size of those smaller regions, for banding frequency analyses. Another embodiment discards regions based upon a threshold for a minimum size of a given region. Even though each pictorial region, i.e., the first pictorial region 302 and the second pictorial region 306, of the example image 300 is still not completely uniform, these standard image regions generally provide a better estimate of the graylevels actually produced by a print device than would an analysis of a whole page including text and blank spaces. It should be appreciated then that the exclusion of identified text and background regions results in an observable increase in the overall accuracy of the estimated graylevels and banding defects. Other embodiments hereof operate to further segment identified segmented regions within an image.

In the example identified segmented regions 400, one or both of the first segmented region 402 and the second segmented region 406 are able to be segmented into smaller regions based upon a size and/or a graylevel uniformity of portions within each region. This improves the estimate of the graylevels within each further segmented region. However, such further segmentation tends to yield a tradeoff between uniformity of a region and a meaningful size of a region for detection of lower frequency banding defects. In certain cases such as when the analysis includes determining the presence of low frequency banding, smaller regions can be merged into surrounding regions to form a larger region. The merging of smaller regions to form a larger region produces a combined segmented region with a size that supports analysis of a particular banding frequency of interest. In one embodiment, a size that supports analysis of a particular banding frequency corresponds to a size that contains at least one half cycle of the particular banding frequency of interest. In one embodiment, one or more banding frequencies of interest are specified based upon, for example, a design of a printer. A size of a combined segmented region in one embodiment is selected so as to support analysis of the lowest frequency within the one or more banding frequencies of interest that are specified for a particular printer.

The merging of two segmented regions is also able to be implemented when the distance between the two segmented regions is smaller than the period exhibited by one or more targeted banding defect(s). When multiple banding frequencies are present, merging of segmented regions can also be carried out at different resolutions levels. Such additional embodiments are provided herein to give the user of the present method various options which may work to their advantage in their own digital document reproduction and computing environments wherein various aspects of the present system and method have been implemented.

Reference is again being made to the flow diagram of FIG. 2.

At 206, a determination is made as to whether a specification of at least one frequency of interest related to conditions within the printer has been received. Most marking systems, such as printer 104 of FIG. 1, have a list of observed banding frequencies within the printed output that correspond to conditions within the marking system, such as deterioration or eminent failure of one or more components within the system. Some embodiments store or otherwise receive a specification of one or more frequencies that are known or expected to correspond to potential wear, failures, or other defects within the system. Some embodiments operate to identify an increase in banding amplitudes at a certain set of specified frequencies where each specified frequency is related to a known potential cause of an observed banding defect in the device producing the images being analyzed. If a specification of at least one frequency of interest has not been received, the method determines frequencies at which appreciable banding defect amplitude(s) are observed.

At 208, if a specification of at least one frequency of interest has not been received, banding frequency information from at least one color parameter value within each identified segmented region of each image being analyzed is determined. Determining such banding frequency information includes performing a separate Fourier transform for each of the segmented regions to determine the amplitude of all frequency components within each region. In general, the user's images that are provided from the image source have different image content in each of the standard image regions on each page and also in regions on different pages. Therefore, the frequency components contributed by the user image content itself that is contained in the different identified segmented regions are not likely to be repeated across the different identified segmented regions. However, for a banding defect being induced by a failed or deteriorated component within the printer, the particular frequency of the banding defect will likely appear over and over again in all of the different regions both within a given page and across all pages output by the printing device under test. For this reason, a method of identifying the recurring frequencies from the segmented regions across a sequence of pages can be used to extract frequencies exhibited by potential banding defects.

At 210, a histogram of occurrence vs. frequency determined from the segmented regions across a sequence of pages is assembled. The assembly of this histogram in one embodiment includes two steps. A first step determines occurrences of each frequency component within each segment based upon whether its amplitude, as determined at 208, is above a certain amplitude threshold. If the amplitude of any frequency component is above that threshold, the occurrence is determined and is set to a value of, for example, one. If the amplitude is not above that threshold, the occurrence is not determined and is set to a value of, for example, zero. In a second step, the total occurrence count for each frequency component then is calculated by accumulating the identified occurrences over all segmented regions across a sequence of pages. The assembly of such histogram of image frequency components enables recurring banding frequencies that repeat over multiple images to be extracted from the generally non-recurring frequency components, as is discussed below.

At 212, based upon the assembled histogram, the occurrences of the determined frequency information are examined to determine one or more frequencies that have appreciable magnitudes of occurrences over the segmented regions across a sequence of pages and thus need to be further analyzed. In one example, a frequency component within the histogram is determined to have an appreciable magnitude of occurrences when its value exceeds the magnitude of occurrences of other frequency components in the histogram or when the magnitude of occurrences exceeds a pre-determined threshold. Further embodiments are able to maintain a trend analysis of frequency components in the histogram and an appreciable magnitude of occurrences is determined to be one that exceeds a level determined based upon that trend analysis.

At 214, if a specification of at least one frequency of interest has been received or a specification of at least one recurring frequency has been identified, via steps 208 through 212 discussed above, banding frequency information for at least one color parameter value within each identified segmented region of each image being analyzed is determined. When at least one recurring frequency is provided, the determining banding frequency information is able to be directed to the spectral areas in the vicinity of the specified frequencies of interest.

At 216, banding amplitudes associated with at least one recurring banding frequency that is received as a frequency of interest or detected as repeating over the images being analyzed are estimated. In one embodiment, amplitudes are estimated by processing the 1-dimensional profiles for at least one color parameter value in one segmented region to obtain amplitude verses frequency characteristic for each segmented region. A peak detection of at least one Fourier transform of the at least one color parameter value for each region is used to estimate the banding amplitudes. The amplitude verses frequency characteristics of the segmented regions on each page and across multiple pages are then further combined to determine recurring banding frequencies that repeat over the multiple images for the multiple pages being analyzed. The frequencies for which amplitudes are estimated, based upon the design and requirements of a particular embodiment, are either determined from analysis of banding frequency information or are received from an external source. The range of the banding frequencies that are considered for estimating the banding amplitude is able to be adjusted based upon expected one or more of: scanner noise, the resolution of the scanned images, the tolerance of false-alarms in the image quality monitoring process, and the like. Once the amplitude of a banding defect is estimated within each segmented region, the overall banding amplitude can then be estimated for the entire page. Additionally or alternatively, when the graylevel variation of a page is insufficient, banding amplitude can be estimated based upon a defined sequence of image prints such as over 10 to 100 pages. One embodiment continuously updates the estimates based upon new pages added to the analysis database. The banding amplitude information obtained from the segmented regions can be projected or interpolated to estimate the banding amplitude that exists at a highly sensitive graylevel. In other words, the banding amplitude information for the segmented regions being analyzed will have their own actual mean gray level. The determined banding amplitude for each segmented region, which is dependent upon the mean graylevel of that region, is projected or interpolated to a highly sensitive graylevel by fitting the data to a function. One example determines the banding amplitude for a page or a sequence of pages by fitting the observed graylevel values to a parabolic function that has a maximum value of the highly sensitive graylevel (which is usually in the vicinity of a 50% graylevel). One embodiment further processes banding frequency information when too few segmented regions are available by weighting the observed graylevels to project the observed banding amplitude at the observed graylevels to estimate a predicted banding amplitude if the image presented a graylevel in a vicinity of a pre-determined value, such as a midpoint graylevel in a vicinity of 50 percent graylevels. One example that projects observed banding amplitude data to a pre-determined value at a "midpoint" graylevel weights, or scales, the banding frequency information determined for an image by a factor equal to 1—(observed graylevel—midpoint)/midpoint). An example embodiment uses 8-bit data to represent quantities which necessarily restricts values to a maximum of 256. The midpoint value would then be around 128. In another embodiment, the estimating the banding amplitude is based upon a moving window analysis of the banding frequency information determined over the plurality of segmented regions. For example, one embodiment is able to assemble banding frequency information over a moving window of the last 100 scanned images and combine the banding frequency information in that window to estimate banding amplitudes. In this case, as a new image is scanned and received for analysis, the oldest imaged within the window, e.g., the first of the 100 images in this example, is discarded as the new image is added. The banding frequency information is then assembled and analyzed for this new set of 100 images to estimate the estimated banding amplitude.

At 218, at least one targeted banding defect is identified based upon the estimated banding amplitude and the at least one recurring banding frequency. Identification of at least one targeted banding defect in the various embodiments is based upon detecting that the estimated banding amplitude either exceeds a level determined to indicate a problem, or the detection is able to be based upon predicting, based upon a trend analysis of a temporal increase of the estimated banding amplitude, that the estimated banding amplitude will exceed a level determined to indicate a problem at some time in the future. Where at least one targeted banding defect is identified based upon the estimated banding amplitude exceeding a level determined to indicate a problem, the level to be exceeded can be based upon a pre-defined value relative to the design of the print device being analyzed. Further embodiments base the level upon adding a predetermined amount to an observed amplitude for the banding frequency information that has been observed over a period of time for the printer's operation. In those cases wherein a targeted banding defect has been identified based upon a prediction that the estimated banding amplitude will exceed a level determined to indicate a problem at some future point, such an embodiment is then able to specify that the defect will occur after, for example, a specified number of additional pages are printed. Such an embodiment is also capable of specifying, based upon an estimated printing utilization rate, that the defect will occur in a specified number of days. This can be readily effectuated by dividing the number of additional pages by an estimated number of pages per day printed by that printer and extrapolating a target date in the production or even when a target printed page.

Some embodiments of the present method further store a relationship between each of several stored banding frequencies and respective conditions associated with each of the stored banding frequency. In these embodiments, a determination is then made to see whether a detected recurring banding frequency that has appreciable banding amplitude is within the plurality of the stored banding frequencies. A condition within the printer is then able to be identified based upon those stored relationships. Based upon the stored relationship, such an embodiment is able to continue to monitor and analyze the output of the printer with particular emphasis on the detected recurring banding frequency, such as by more frequently performing such analyses. In the case where the recurring banding frequency does not correspond to any of the stored relationships, the identified banding defect can be used to alert an operator to perform a visual inspection or verification, or alternatively just proceed with monitoring the defect using additional printed pages.

At 220, an alert is initiated to an operator of the digital imaging system in response to identifying the at least one targeted banding defect. In one embodiment, the alert is provided via an email message. In another embodiment, a display on an operator information screen or control terminal is provided. Alternatively, any suitable indication is given to an operator of the device, customer service representative, manufacturer's representative, or to a manager. Such an alert may include an indication of a deterioration of one or more components of the digital imaging system, or an indication of at least one part, based upon the recurring banding frequency, within the digital imaging system that is deteriorating. A networked database or local storage may further be queried for a list of possible solutions or action to be taken based upon the conditions which precipitated the alert. Such alternatives are intended to fall within the scope of the appended claims.

The present method analyzes images of pages printed by users of a printer 104 of FIG. 1 to determine the printer's banding performance. In practice, this has an advantage that the user's printed pages are the output that is most relevant to the user of the printer, and therefore more relevant performance information is obtained. Banding performance monitoring based upon analysis of actual user output instead of analysis of pre-determined test-pattern output provides more relevant quality monitoring, in some applications. The method can be used in combination with test targets. For example, detection of a banding defect by the above described method can be used to trigger a test and analysis using pre-determined test targets that are printed for the sole purpose of more accurately determining banding performance.

Figure 5:
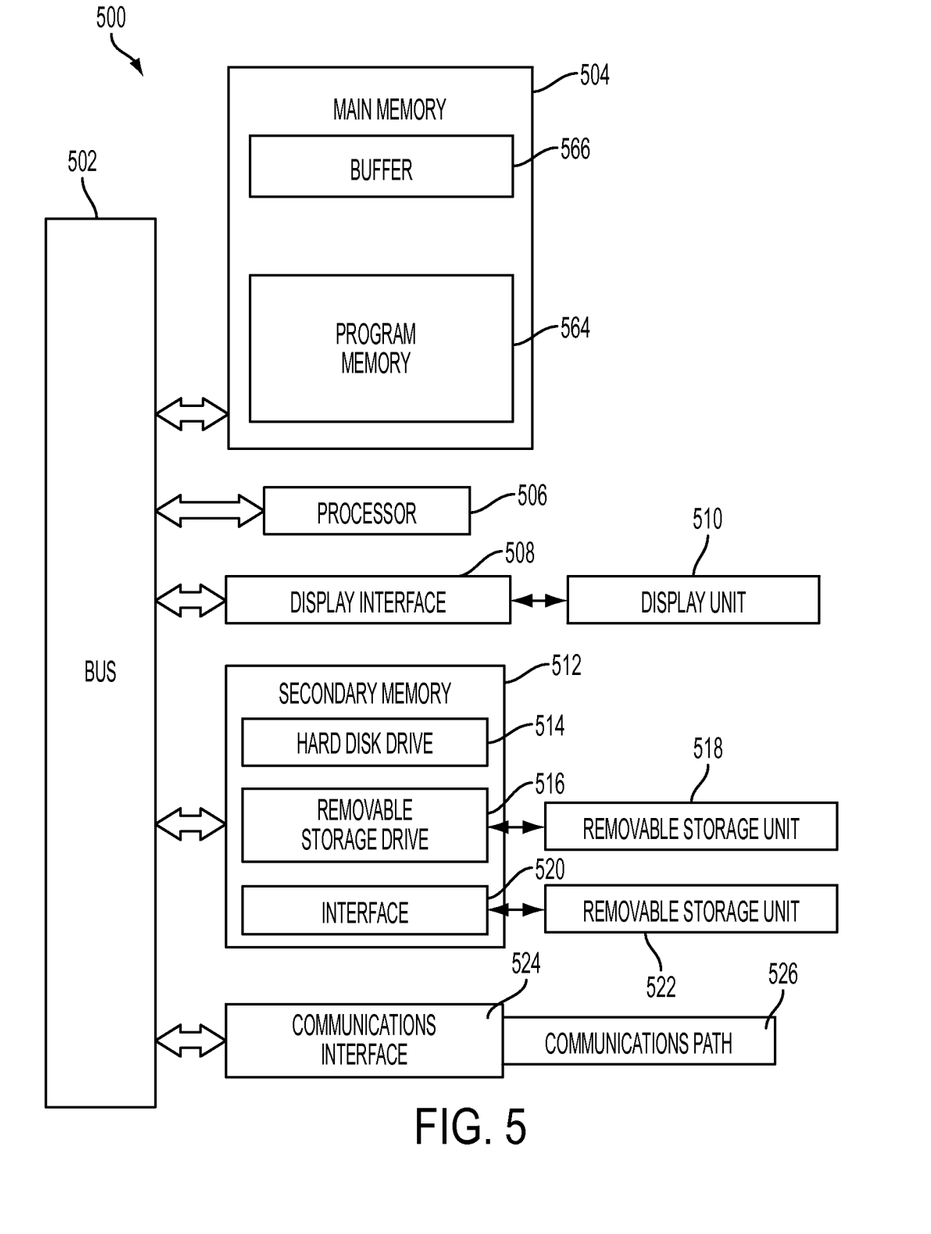
FIG. 5 illustrates a block diagram of one example embodiment of a special purpose computer useful for implementing one or more aspects of the present banding defect detection and trend analysis method.

Reference is now made to FIG. 5 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in FIG. 1 and the flow diagrams of FIG. 2.

Special purpose computer system 500 includes processor 506 for executing machine executable program instructions for carrying out all or some of the present method. The processor is in communication with bus 502. The system includes main memory 504 for storing machine readable instructions. Main memory may comprise random access memory (RAM) to support reprogramming and flexible data storage. Buffer 566 stores data addressable by the processor. Program memory 564 stores machine readable instructions for performing the present method. A display interface 508 forwards data from bus 502 to display 510. Secondary memory 512 includes a hard disk 514 and storage device 516 capable of reading/writing to removable storage unit 518, such as a floppy disk, magnetic tape, optical disk, etc. Secondary memory 512 may further include other mechanisms for allowing programs and/or machine executable instructions to be loaded onto the processor. Such mechanisms may include, for example, a storage unit 522 adapted to exchange data through interface 520 which enables the transfer of software and data. The system includes a communications interface 524 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 526 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for detecting banding defects in a digital imaging system, the method comprising:
   scanning a plurality of digital images, wherein each digital image corresponds to a page printed by a digital imaging system whereon banding defects are intended to be analyzed;
   identifying, within each image of said scanned digital images, a plurality of segmented regions, each of said segmented regions comprising standard image regions of each image;
   determining banding frequency information from at least one color parameter value within each of said identified segmented regions;
   estimating an amount of banding amplitude associated with at least one recurring banding frequency that repeats, within the banding frequency information, over said plurality of images;
   detecting at least one targeted banding defect based upon said banding amplitude and said recurring banding frequency; and
   initiating, in response to the detecting the at least one targeted banding defect, an activity associated with the digital imaging system.

2. The method of claim 1, further comprising receiving a specification of at least one frequency of interest related to a respective condition within the digital imaging system, wherein the recurring banding frequency corresponds to the at least one frequency of interest.

3. The method of claim 1, wherein said detecting is based upon said banding amplitude exceeding one of a pre-defined value and a combination of previously observed banding amplitudes within previously scanned digital images.

4. The method of claim 1, further comprising determining, based upon said banding frequency information and prior to detecting at least one targeted banding defect, said recurring banding frequency.

5. The method of claim 1, further comprising storing a relationship between each of a plurality of stored banding frequencies and respective conditions associated with each of said stored banding frequencies, said at least one recurring banding frequency being within a plurality of stored banding frequencies and detecting the condition based upon said stored relationship.

6. The method of claim 1, wherein the activity comprises one of sending a control signal to the digital imaging system and sending an alert to an operator of said digital imaging system, wherein the alert comprises one of an indication of a deterioration of at least one component of the digital imaging system, and an indication of at least one part, based upon the recurring banding frequency, within the digital imaging system that is deteriorating.

7. The method of claim 1, wherein the at least one color parameter value is one of related to graylevel in lightness and is specified as one of a combination of: Red, Green, and Blue; Cyan, Magenta, Yellow, and Black; and CIE L*, a*, b* values.

8. The method of claim 1, wherein, prior to said determining, further comprising:
   discarding, from within said plurality of segment regions, those segmented regions that have a size below a size threshold; and
   merging at least two segmented regions within said plurality of segmented regions to produce a combined segmented region with a size that supports analysis of a particular banding frequency of interest.

9. The method of claim 1, further comprising creating a histogram, over said pages of documents, of said banding frequency information, said estimating being based upon said histogram, and wherein said detecting at least one targeted banding defect being based upon selecting one of said banding frequencies over other banding frequencies in said histogram based upon a magnitude within said histogram of said banding frequency information.

10. The method of claim 1, wherein said estimating is based upon a moving window analysis of the banding frequency information determined over the plurality of segmented regions.

11. The method of claim 1, further comprising weighting, for each segmented region, a banding amplitude associated with each segmented region based upon an average of said at least one color parameter value associated with that segmented region, said weighting being based upon a difference between one and a square of a quantity proportional to a difference between a pre-determined value of said banding amplitude.

12. The method of claim 11, further comprising determining the banding amplitude associated with at least one of the each segmented region by interpolation between two banding amplitudes within the banding frequency information.

13. The method of claim 1, wherein said banding amplitude is estimated based on a peak detection of at least one Fourier transform of at least one of said color parameter values for each region.

14. The method of claim 13, wherein said frequency range of said identified banding defect is determined from any of: a noise of said scanning device, a resolution of scanning device, and a level of a tolerance of false alarms in an image path which said banding frequency information was determined.

15. A system for detecting banding defects in a digital imaging system, the system comprising:
   a memory;
   a storage medium for storing data; and
   a processor in communication with said storage medium and said memory, said processor executing machine readable instructions for performing the method of:
      scanning a plurality of digital images, wherein each digital image corresponds to a page printed by a digital imaging system whereon banding defects are intended to be analyzed;
      identifying, within each image of said scanned digital images, a plurality of segmented regions, each of said segmented regions comprising standard image regions of each image;
      determining banding frequency information from at least one color parameter value within each of said identified segmented regions;
      estimating an amount of banding amplitude associated with at least one recurring banding frequency that repeats, within the banding frequency information, over said plurality of images;
      detecting at least one targeted banding defect based upon said banding amplitude and said recurring banding frequency; and
      initiating, in response to the detecting the at least one targeted banding defect, an activity associated with the digital imaging system.

16. The system of claim 15, further comprising weighting, for each segmented region, a banding amplitude associated with each segmented region based upon an average of said at least one color parameter value associated with that segmented region, said weighting being based upon a difference between one and a square of a quantity proportional to a difference between a pre-determined value of said banding amplitude.

17. The system of claim 15, wherein, prior to said determining, further comprising:
discarding, from within said plurality of segment regions, those segmented regions that have a size below a size threshold; and
merging at least two segmented regions within said plurality of segmented regions to produce a combined segmented region with a size that supports analysis of a particular banding frequency of interest.

18. The system of claim 15, further comprising creating a histogram, over said pages of documents, of said banding frequency information, said estimating being based upon said histogram, and wherein said detecting at least one targeted banding defect being based upon selecting one of said banding frequencies over other banding frequencies in said histogram based upon a magnitude within said histogram of said banding frequency information.

19. The system of claim 15, wherein said estimating is based upon a moving window of said banding frequency information determined over said plurality of segmented regions.

20. A method for detecting banding defects in a digital imaging system, the method comprising:
scanning a plurality of digital images, wherein each image within the plurality of digital images corresponds to a page printed by a digital imaging system whereon banding defects are to be analyzed;
identifying, within each image of the plurality of digital images, a plurality of segmented regions, the segmented regions comprising standard image regions of each image within the plurality of digital images;
discarding, from within the plurality of segmented regions, segmented regions that have a size below a size threshold;
merging at least two segmented regions within the plurality of segmented regions to produce a combined segmented region with a size that supports analysis of a particular banding frequency of interest;
determining banding frequency information from at least one color parameter value within each segmented region within the plurality of segmented regions;
estimating an amount of banding amplitude associated with at least one recurring banding frequency that repeats, within the banding frequency information, over the plurality images;
detecting at least one targeted banding defect based upon the banding amplitude and the at least one recurring banding frequency; and
initiating an alert to an operator of said digital imaging system in response to the detecting the at least one targeted banding defect.

* * * * *